United States Patent [19]

Standley

[11] 4,355,069
[45] Oct. 19, 1982

[54] FLEXIBLE LOAD-CARRYING CORD, APPARATUS AND POLYMERIC CONSTRUCTION UTILIZING SAME

[75] Inventor: Paul M. Standley, Springfield, Mo.

[73] Assignee: Dayco Corporation, Dayton, Ohio

[21] Appl. No.: 244,530

[22] Filed: Mar. 17, 1981

[51] Int. Cl.³ .................... D02G 3/36; B60C 9/00
[52] U.S. Cl. .................... 428/292; 57/217;
57/242; 57/902; 152/359; 264/108; 428/295;
428/375; 428/377; 474/260
[58] Field of Search .............. 57/902, 217, 221, 223,
57/234, 242; 152/359, 356; 428/289, 292, 295,
361, 375, 377, 378; 474/263, 260; 264/103, 108,
174; 260/37 R, 42.17, 42.22; 198/847

[56] References Cited

U.S. PATENT DOCUMENTS

| | | | |
|---|---|---|---|
| 3,009,311 | 11/1961 | Kung-Chih Wang | 57/225 |
| 3,657,938 | 4/1972 | Fisher | 156/140 |
| 4,056,591 | 11/1977 | Goettler et al. | 264/108 |
| 4,057,610 | 11/1977 | Goettler et al. | 264/108 |
| 4,183,888 | 1/1980 | Mutzke | 264/174 |
| 4,240,782 | 12/1980 | McPhee et al. | 264/108 |
| 4,262,480 | 4/1981 | Wasserman et al. | 428/377 |

*Primary Examiner*—Michael W. Ball
*Attorney, Agent, or Firm*—Joseph V. Tassone

[57] ABSTRACT

A flexible load-carrying cord which is adapted for embedment in a polymeric product, apparatus and method for making such a cord, and product utilizing same are provided wherein the cord comprises a plurality of elements which are twisted in one direction and normally have a tendency to untwist and a polymeric sleeve is bonded around the cord with the sleeve comprising a polymeric matrix having a plurality of discrete randomly arranged fibers embedded therein with the fibers being disposed in a helical pattern which extends in a direction opposite from the one direction and the sleeve with its fibers serving to substantially eliminate the tendency of the elements to untwist.

13 Claims, 9 Drawing Figures

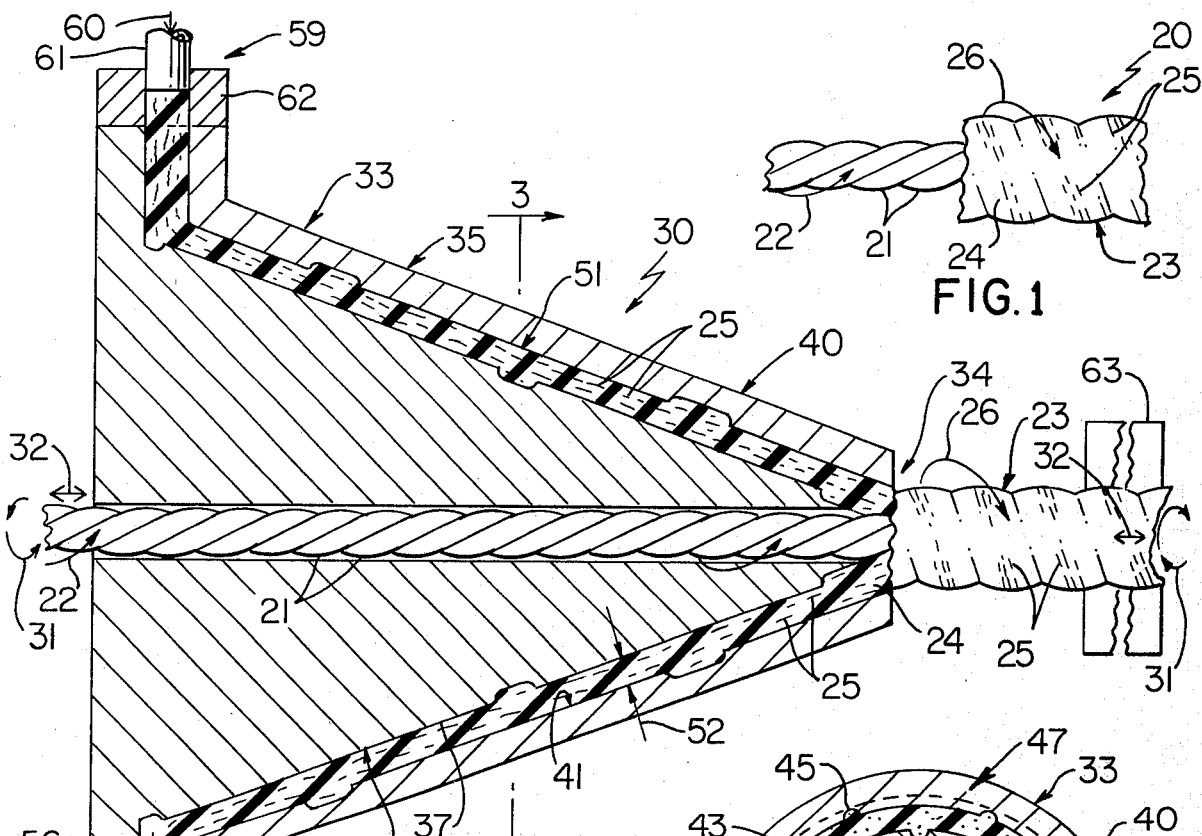

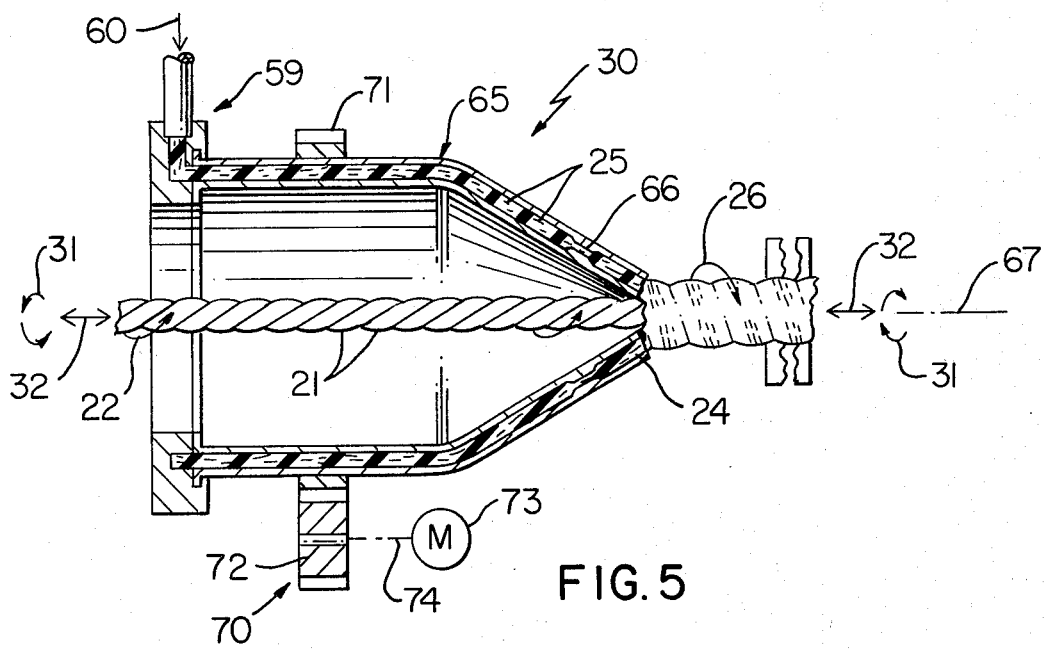
FIG.5
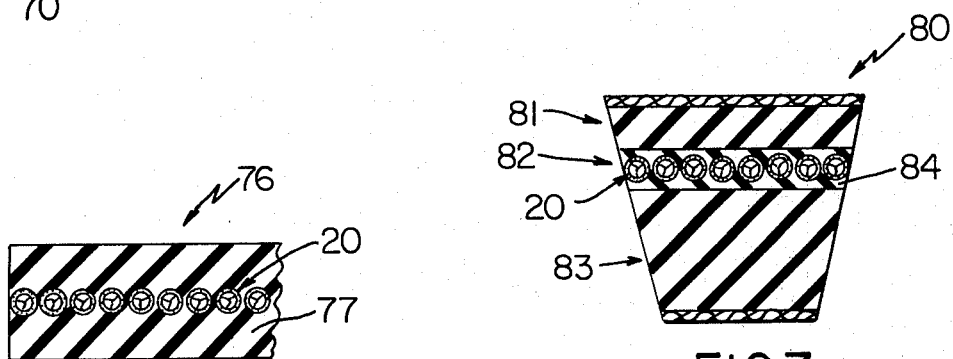
FIG.6
FIG.7
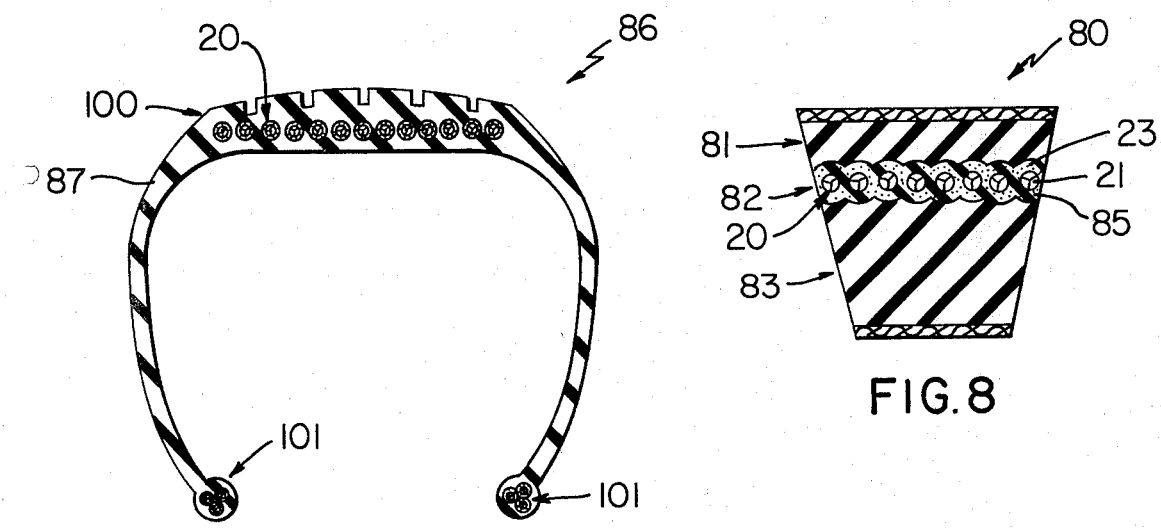
FIG.9
FIG.8

FLEXIBLE LOAD-CARRYING CORD, APPARATUS AND POLYMERIC CONSTRUCTION UTILIZING SAME

BACKGROUND OF THE INVENTION

1. Field of the Invention

This invention relates to a flexible load-carrying cord which is adapted for embedment in a polymeric construction apparatus and method for making such cord, and polymeric construction having such cord embedded therein.

2. Prior Art Statement

Flexible load-carrying cords comprised of a plurality of twisted elements are widely used in polymeric products or constructions for reinforcement and/or load-carrying purposes by embedding same in their associated constructions. However, such cords are generally deficient because in some applications they are not capable of being bonded in position in a tenacious high strength manner and in other applications they tend to become untwisted thereby placing substantial stress on adjoining polymeric material within which they are embedded resulting in failure of the cords, weakening of adjoining polymeric matrix material, and eventual premature failure of the associated polymeric construction.

It is known in the art to provide a polymeric coating or sleeve around one or more flexible members to define a structure which may be used for various purposes. For example, U.S. Pat. No. 4,183,888 discloses a method of providing a plastic coating on a heated wire.

It is also known in the art to embed elongate particles or fibers within a polymeric matrix to define a reinforced polymeric structure. For example, U.S. Pat. No. 3,657,938 teaches the utilization of elongated fibers in the load-carrying section of an endless power transmission belt and the fibers serve to reinforce the load-carrying section and are arranged substantially in alignment with the endless path of the belt. Similarly, U.S. Pat. No. 4,056,591 teaches a method of orienting fibers from the axial direction, particularly in hose formed by extrusion. Finally, it has also been proposed in U.S. Pat. No. 4,057,610 to define a hose comprising extrudable polymer reinforced with discontinuous fibers oriented in the radial direction.

It is an object of this invention to provide an improved flexible load-carrying cord which is adapted for embedment in a polymeric construction.

Another object of this invention is to provide an improved apparatus and method for making such a cord.

Another object of this invention is to provide an improved polymeric construction utilizing such cord.

Other aspects, embodiments, objects, and advantages of this invention will become apparent from the following specification, claims, and drawings.

SUMMARY

In accordance with the present invention there is provided an improved flexible load-carrying cord which overcomes the above-mentioned deficiencies; and such improved cord is adapted for embedment in a polymeric construction and comprises a plurality of elements which are twisted in one direction and normally have a tendency to untwist.

In accordance with one embodiment of this invention a polymeric sleeve is bonded around the elements with the sleeve comprising a polymeric matrix having a plurality of discrete randomly arranged fibers embedded therein with the fibers being disposed in a helical pattern which extends in a direction opposite from the one direction; and, the sleeve with its fibers serves to substantially eliminate any tendency of the elements to untwist.

Also provided in accordance with this invention is an improved apparatus and method for making a flexible load-carrying cord of the character mentioned which is adapted for embedment in a polymeric construction.

This invention also provides an improved construction made primarily of polymeric material which has a load-carrying cord of the character mentioned embedded in at least a portion thereof.

BRIEF DESCRIPTION OF THE DRAWINGS

The accompanying drawings show present preferred embodiments of this invention, in which FIG. 1 is a fragmentary view with parts broken away illustrating one exemplary embodiment of a flexible load-carrying cord of this invention;

FIG. 2 is a view with parts in cross section, parts in elevation, and parts broken away illustrating one exemplary embodiment of an apparatus and method for making the cord of FIG. 1;

FIG. 3 is a view taken essentially on the line 3—3 of FIG. 2;

FIG. 4 is a view in elevation of a pair of die components comprising the apparatus of FIG. 2 and illustrating such components exploded apart;

FIG. 5 is a view with parts in cross section, parts in elevation, and parts broken away illustrating another exemplary embodiment of an apparatus and method which may be used in making the cord of FIG. 1;

FIG. 6 is a fragmentary cross-sectional view of a conveyor belt construction which utilizes a load-carrying cord of this invention;

FIG. 7 is a cross-sectional view of an endless power transmission belt which also utilizes a load-carrying cord of this invention in its load-carrying section;

FIG. 8 is a view similar to FIG. 7 of an endless power transmission belt which utilizes a modification of the load-carrying cord of this invention; and FIG. 9 is a cross-sectional view illustrating a pneumatic tire construction which also utilizes a load-carrying cord of this invention.

DETAILED DESCRIPTION

Reference is now made to FIG. 1 of the drawings which illustrates one exemplary embodiment of a flexible load-carrying cord of this invention which is designated generally by the reference numeral 20 and such cord 20 is particularly adapted for embedment in a polymeric construction of any suitable type known in the art and typical constructions will be described subsequently. The cord 20 comprises a plurality of elements each designated by the reference numeral 21 which are twisted in one direction as indicated by the arrow 22 and usually such elements are highly twisted and have a normal tendency to untwist, particularly after the elements 21 are embedded in an associated polymeric matrix. In accordance with the teachings of this invention the cord 20 has a polymeric sleeve, designated generally by the reference numeral 23, bonded around the twisted elements 21 and such sleeve is of unique construction and will now be described in detail.

The sleeve 23 is comprised of a polymeric matrix 24 and has a plurality of discrete randomly arranged fibers embedded therein and a representative few of such fibers will be designated by the same reference numeral 25. The fibers 25 are disposed in a helical pattern which extends in a direction 26 which is opposite from the direction 22 in which the elements 21 are twisted; and, the sleeve 23 with its fibers 25 serves to substantially eliminate any tendency for the elements 21 to untwist.

Any desired member, of elements 21 may be used in a cord 20 and such elements may be made of metallic material, such as steel, or non-metallic material including either a natural or synthetic material. Examples of synthetic materials which may be employed include nylon, polyaramid, polyester, and the like.

The sleeve 23 is comprised of a polymeric matrix 24 as previously mentioned and such matrix may be any suitable composition known in the art including either a natural or synthetic material; and, preferably the polymer comprising the matrix 24 is a rubber compound.

The fibers 25 comprising the sleeve 23 may also be of any suitable material known in the art, including metallic and nonmetallic material; and, such fibers are preferably nonmetallic fibers made of either a natural or synthetic material. Each of the fibers 25 preferably has a diameter ranging between 0.001 and 0.050 inch and a length ranging between 0.001 and several inches with the preferred length being roughly ¼ of an inch.

The sleeve 23 is preferably comprised of between 5 and 50 parts by weight of fibers for each one hundred parts of polymer defining the matrix material 24. Further, the polymeric matrix 24 may be provided with other constituents including one or more of items such as, a filler, plasticer, antidegradant, processing aid, curative, bonding agent, and the like. The particular items selected for a polymeric matrix will vary depending upon the weight and type of polymer and the type and weight of fibers used.

The cord 20 as illustrated in FIG. 1 may be substantially fully cured before embedment in its polymeric construction. However, it is preferable that the cord 20 be uncured or only partially cured before embedment whereupon such uncured or partially cured cord is then finally cured together with its polymeric construction.

Having described the cord 20 of this invention, reference is now made to FIG. 2 of the drawings which illustrates one exemplary embodiment of an apparatus and method for making the cord and such apparatus and method are designated generally by the reference numeral 30. A description of the apparatus and method will now be presented and the same reference numerals will be used for constituents or components of the cord 20 during making thereof as were used in the completed cord described above.

The apparatus 30 comprises means for twisting a plurality of elements 21 in one direction and such twisting means is designated schematically by arrows 31 at the left and right ends of the illustration of FIG. 2; and, it will be appreciated that the elements 21 (after having been twisted by the twisting means 31) normally have a tendency to untwist. The apparatus 30 also has means for moving and tensioning the twisted elements 22 and such moving and tensioning means are designated schematically by double arrows 32 at each end of FIG. 2.

The apparatus 30 also has means 33 for forming a flowable polymeric matrix material 24 which has a plurality of discrete randomly arranged fibers 25 embedded therein to define the polymeric sleeve 23 having the fibers disposed in the previously described helical pattern extending in the direction 26 which is opposite from the direction 22 in which the elements 21 are twisted. The apparatus also has means 34 for bonding the sleeve concentrically around and against the elements during movement of such elements by the moving means 32 so that upon curing the sleeve 23 the fibers 25 serve to substantially eliminate any tendency for the elements 22 to untwist and as previously mentioned.

The forming means 33 and bonding means 34 in this example of the invention are defined as an extrusion die which is designated generally by the reference numeral 35. The die 35 is provided for extruding therethrough flowable material 24 with its embedded fibers 25 to define the sleeve 23 having the helical pattern in such fibers. The extrusion die 35 operates to define the sleeve concentrically around and bonded against the elements 21.

The die 35 is a stationary die and has integral means therein for defining the helical pattern in the fibers 25. In particular, and as illustrated in FIGS. 2, 3 and 4 of the drawings, the die 35 comprises an inner die component 36 which has an outside substantially frustoconical surface 37 and a cooperating outer die component 40 which has an inside substantially frustoconical surface 41. The previously mentioned integral means in the die 35 comprises curved means associated with the surfaces 37 and 41 and in this example such curved means comprises groove means.

In particular, the groove means comprises a plurality of curved grooves, each designated by the same reference numeral 43, extending into the inner die component 36 from its frustoconical outside surface 37; and, as will be apparent from FIG. 3 of the drawings the grooves 43 are disposed in equal angularly spaced relation having an angle 44 therebetween of roughly 45°. The groove means also comprises a plurality of curved grooves, each designated by the reference numeral 45, extending in the outer die component 40 from its frustoconical inside surface 41. The curved grooves 45 in the component 40 are also disposed in equal angularly spaced relation with an angle of roughly 45° therebetween and it will be seen, typically at 47 in FIG. 3, that each groove 45 in the outer component is disposed substantially midway between a pair of grooves 43 in the inner component 36 with the die components 36 and 40 in assembled relation.

The extrusion die 35 of the apparatus 30 has means 50 for spacing the die components 36 and 40 to define a substantially frustoconical volume 51 therebetween; and, the volume 51 has a substantially radial thickness 52 which is roughly equal to the thickness of the sleeve 23. The spacing means 50 in this example of the invention comprises a plurality of spacing members 53 and associated threaded screws 54; and, a typical spacing member 53 is illustrated in FIG. 2 together with a typical threaded screw 54.

Each spacing member 53 is held in position by an associated threaded screw 54 which extends through an opening 55 in the outer die component 40 and through an aligned opening 56 in the spacing member 53. The threaded inner end portion of the threaded screw 54 is threaded within a blind threaded opening 57 in the inner die component 36. The dimensional thickness of the spacing members 53 is precisely controlled to define any desired thickness for the sleeve 23; and, each spacing member may comprise a plurality of precise washerlike components which are disposed in stacked relation until the desired thickness is achieved.

The apparatus 30 also has means 59 for supplying the flowable polymeric material 24 into the frustoconical volume 51 from an associated extruder which is designated schematically by an arrow 60. The means 59 comprises a high pressure conduit 61 which is suitably held in sealed communication (by welds, or the like) in a sealing ring structure 62 associated with the large diameter end of the frustoconical volume 51. The outer end of the conduit 61 is in flow communication with the extruder 60.

The apparatus and method 30 may also utilize suitable means to provide partial precuring of the polymeric matrix material 24 with the fibers 25 therein disposed in their helical pattern, and as previously described; and, such precuring means may be in the form of a curing apparatus 63. The apparatus 63 may be used to provide generally of the order of 10 to 20% partial precuring of the polymeric sleeve 23. The resulting cord 20 may then be embedded in an associated polymeric construction, of the type to be subsequently described. In the case of an uncured or partially cured sleeve 23, final curing for such sleeve 23 takes place during final curing of the polymeric construction within which the cord 20 is used. The apparatus 63 may be any suitable curing apparatus known in the art including a microwave curing apparatus, or an apparatus which provides curing by steam or hot air at controlled temperatures and pressures.

In those applications in which the sleeve 23 is uncured or only partially cured and the associated cord 20 is not used immediately such sleeve is preferably dusted with a suitable powder in order to render its outside surface less tacky and enable easier handling of the overall cord and coiling thereof on a supply spool, for example. The powder may be any suitable powdered fatty acid or fatty acid salt and examples of same include zinc stearate, zinc oleate, or the like.

It will also be appreciated that instead of the apparatus 63 providing only partial curing of the sleeve 23, it may provide substantially full curing thereof. In this instance the composition of the sleeve 23 is preferably such that it will be tenaciously bonded within the polymeric construction in which it is embedded as a load-carrying component thereof.

Another exemplary embodiment of the apparatus and method of this invention is illustrated in FIG. 5 of the drawings. The apparatus and method of FIG. 5 are substantially identical to the apparatus and method previously described and thus will be designated by the same reference numeral 30 as before; and, components of the apparatus of FIG. 5 which are similar to previously described components have also been designated by the same reference numerals as before. Only those components which are substantially different from corresponding components of the previously described apparatus 30 will be designated by a new reference numeral and described in detail.

The apparatus of FIG. 5 comprises the twisting means 31, the moving and tensioning means 32, and the means 59 for supplying the polymeric material 24 from an extruder 60, essentially as previously described. However, it will be seen that instead of the extrusion die (which is provided for forming and bonding flowable polymeric matrix material) being a stationary die such die is a rotatable die and is designated generally by the reference numeral 65. The rotatable die 65 has an annular orifice 66 provided in the structural components thereof and the orifice 66 is sized to align the fibers 25 substantially parallel to the longitudinal axis of the die 65 which coincides with the central longitudinal axis 67 of the elements 21 upon extruding therethrough the polymeric matrix 24 with its embedded fibers 25. It will be appreciated that if the die 65 were to be maintained stationary, i.e., not rotated, the fibers 25 of the sleeve 23 would remain substantially parallel to the axis 67 in the completed cord 20.

However, the apparatus 30 has means 70 for rotating the rotatable die 65 during movement of the twisted elements 21 in their rectilinear path as produced by the moving means 32 to thereby dispose the fibers 25 in a helical path during the defining and bonding of the sleeve against the elements 21, and such helical path extends in the direction 26 (as previously described) which is opposite from the direction 22 in which the elements 21 are twisted by the twisting means 31.

The rotating means 70 comprises a ring gear 71 which is fixed around the rotatable die 65 and a spur gear 72 which is adapted to engage and rotate the ring gear 71 and die 65. The spur gear 72 is driven by a motor 73 which is connected thereto by a mechanical connection 74.

Having described the improved load-carrying cord 20 of this invention and two embodiments of an exemplary apparatus and method for making such a cord, reference is now made to FIGS. 6, 7, 8, and 9 for presentations of typical exemplary embodiments of polymeric constructions which have the improved load-carrying cord 20 provided in at least a portion of each construction.

The cord 20 is illustrated in FIG. 6 embedded in a central portion of a polymeric construction defined as a belt conveyor 76. The belt conveyor 76 is made primarily of a polymeric matrix material 77 in the form of rubber and the cord 20 is a helically wound load-carrying cord.

FIG. 7 illustrates the load-carrying cord 20 provided in an endless power transmission belt 80. The belt 80 comprises a tension section 81, a load-carrying section 82, and a compression section 83; and, the cord 20 is provided as a helically wound cord and as an integral part of the load-carrying section 82. The cord 20 is embedded in a suitable gum cushion 84 of the load-carrying section 82.

The polymeric construction of FIG. 8 is also an endless power transmission belt which again is designated by the general reference numeral 80. The belt 80 of FIG. 8 has a tension section 81, a load-carrying section 82, and a compression section 83 which is provided with a load-carrying cord 20. The load-carrying cord 20 is also helically wound; however, such cord has a sleeve 23 which is of large radial thickness 85. The large radial thickness 85 is such that it is not necessary to embed the cord 20 in the usual cord cushion. Instead, the sleeve 23 serves the multiple purpose of holding the twisted elements 21 in position so as to prevent untwisting thereof as well as defining the cord cushion.

The polymeric construction of FIG. 9 is in the form of a pneumatic tire which is designated generally by the reference numeral 86. For ease of presentation, the tire 86 is shown as a simplified structure which is made primarily of a rubber matrix material 87 and is shown without reinforcing fabrics, and the like, usually comprising such a tire. The cord 20 is provided adjacent the tire tread and in each tire bead as shown at 100 and 101 respectively.

The polymeric constructions illustrated in FIGS. 6, 7, 8, and 9 in each instance have been shown by cross hatching as being made of polymeric material in the form of rubber; however, it is to be understood that any suitable polymeric material may be employed including not only rubber but synthetic plastic material as well.

It should be emphasized that in making the various polymeric constructions illustrated in FIGS. 6, 7, 8, and 9 the improved load-carrying cord of this invention is in each instance preferably disposed in the polymeric construction while the cord 20 is in a substantially uncured or only partially cured condition. However, it will be appreciated that the cord 20 may be completely cured, if desired, before disposal in an associated polymeric construction.

The radial thickness of the sleeve 23 provided around the twisted elements 21 of a cord 20 may vary depending on the application. For example, a bundle of twisted elements 21 having an outside diameter of 0.150 inch may have a sleeve 23 which has a radial thickness ranging between roughly 0.010 and 0.100 inch.

The cord 20 may be used to define an associated polymeric construction, such as the previously described constructions of FIGS. 6 through 9 in a continuous process immediately after extruding the sleeve 23 concentrically around and against the twisted elements 21. However, in many instances the cord 20 with its uncured sleeve may be coiled on an associated spool to define a supply spool or roll thereof after passing same through a dusting chamber containing a powdered fatty acid or fatty acid salt as mentioned earlier.

As indicated above, the sleeve 23 is comprised of various items or components of the character previously described; and, such components include suitable bonding material. The particular bonding material employed will vary depending upon the material used to define the elements 21 and the other components of the sleeve 23. However, such bonding material may be a cobalt II complex, elemental sulphur, zinc oxide, a resorcinolic (or phenolic or complex of the two) resin, a methylene donor resin, silica, or other materials known in the art to enhance the adhesion of a polymeric or rubber sleeve to a cord core comprised of twisted elements 21.

While present exemplary embodiments of this invention, and methods of practicing the same, have been illustrated and described, it will be recognized that this invention may be otherwise variously embodied and practiced within the scope of the following claims.

What is claimed is:

1. In a flexible load-carrying cord which is adapted for embedment in a polymeric construction said cord comprising a plurality of elements which are twisted in one direction and normally have a tendency to untwist, the improvement comprising a polymeric sleeve bonded around said elements, said sleeve comprising a polymeric matrix having a plurality of discrete randomly arranged fibers embedded therein, said fibers being disposed in a helical pattern which extends in a direction opposite from said one direction, and said sleeve with its fibers serving to substantially eliminate said tendency of said elements to untwist.

2. A cord as set forth in claim 1 in which said elements are made of metallic material.

3. A cord as set forth in claim 1 in which said elements are made of non-metallic material.

4. A cord as set forth in claim 3 in which said non-metallic material is polymeric material.

5. A cord as set forth in claim 1 in which each of said fibers has a diameter ranging between 0.001 and 0.050 inch and a length ranging between 0.001 and several inches.

6. A cord as set forth in claim 5 in which said fibers are made of non-metallic material.

7. A cord as set forth in claim 6 in which said fibers comprise between 5 and 50 parts by weight for each 100 parts of polymer defining said matrix material.

8. A cord as set forth in claim 7 in which said polymer is rubber and said fibers are organic fibers.

9. In a construction made primarily of polymeric material and having a flexible load-carrying cord embedded in at least a portion thereof, said cord comprising a plurality of elements which are twisted in one direction and normally have a tendency to untwist, the improvement comprising a polymeric sleeve bonded around said elements and defining the outer part of said cord, said sleeve comprising a polymeric matrix having a plurality of discrete randomly arranged fibers embedded therein, said fibers being disposed in a helical pattern which extends in a direction opposite from said one direction, and said sleeve with its fibers serving to substantially eliminate said tendency of said elements to untwist.

10. A construction as set forth in claim 9 defined as a power transmission belt wherein said portion is a load-carrying section of said belt and said load-carrying cord is embedded in said load-carrying section.

11. A construction as set forth in claim 10 in which said polymeric sleeve is of substantial thickness and serves as a cushion for said elements of said cord.

12. A construction as set forth in claim 10 defined as a belt conveyor wherein said portion is a central load-carrying portion of said belt conveyor.

13. A construction as set forth in claim 10 defined as a pneumatic tire wherein said portion is a load-carrying portion of said tire.

* * * * *